United States Patent
Brickell et al.

(10) Patent No.: US 10,887,398 B2
(45) Date of Patent: *Jan. 5, 2021

(54) EFFICIENT PROVISIONING OF DEVICES

(71) Applicant: Intel Corporation, Santa Clara, CA (US)

(72) Inventors: Ernie F. Brickell, Portland, OR (US); Jesse R. Walker, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/594,193

(22) Filed: Oct. 7, 2019

(65) Prior Publication Data

US 2020/0106837 A1    Apr. 2, 2020

Related U.S. Application Data

(63) Continuation of application No. 15/200,450, filed on Jul. 1, 2016, now Pat. No. 10,440,122.

(51) Int. Cl.
*H04W 12/00* (2009.01)
*H04L 29/08* (2006.01)
*H04W 4/80* (2018.01)
*H04L 29/06* (2006.01)

(52) U.S. Cl.
CPC .......... *H04L 67/125* (2013.01); *H04L 67/02* (2013.01); *H04L 67/10* (2013.01); *H04L 67/12* (2013.01); *H04L 67/42* (2013.01); *H04W 4/80* (2018.02); *H04W 12/00* (2013.01)

(58) Field of Classification Search
CPC ................................ H04W 67/10; H04W 4/80

USPC .......................................................... 709/223
See application file for complete search history.

(56) References Cited

U.S. PATENT DOCUMENTS

| 10,440,122 | B2 | 10/2019 | Brickell et al. | |
| 2006/0039336 | A1 | 2/2006 | Ishimura | |
| 2010/0068997 | A1* | 3/2010 | Dunko | H04W 4/50 455/41.1 |
| 2016/0294828 | A1 | 10/2016 | Zakaria | |
| 2018/0007140 | A1 | 1/2018 | Brickell et al. | |

FOREIGN PATENT DOCUMENTS

| CN | 109417555 | 3/2019 | |
| WO | 2013048645 | 4/2013 | |
| WO | WO-2013048645 A1 * | 4/2013 | ........... H04L 63/062 |

(Continued)

OTHER PUBLICATIONS

"International Application Serial No. PCT US2017 037854, Invitation to Pay Add'l Fees and Partial Search Rpt dated Jul. 28, 2017", 7 pgs.

(Continued)

*Primary Examiner* — Glenford J Madamba
(74) *Attorney, Agent, or Firm* — Schwegman Lundberg & Woessner, P.A.

(57) ABSTRACT

Disclosed in some examples are methods, systems, and machine readable mediums that provide for the configuration and provisioning of computing devices. In particular, computing devices with limited user interfaces, such as some IoT devices. The functionality of the IoT devices is thus improved to allow for more efficient, more secure, and faster configuration.

16 Claims, 11 Drawing Sheets

(56) References Cited

FOREIGN PATENT DOCUMENTS

| WO | 2014052381 | 4/2014 |
|----|------------|--------|
| WO | 2015058680 | 4/2015 |
| WO | 2018005128 | 1/2018 |

OTHER PUBLICATIONS

"International Application Serial No. PCT US2017 037854, International Search Report dated Sep. 21, 2017", 10 pgs.
"International Application Serial No. PCT US2017 037854, Written Opinion dated Sep. 21, 2017", 7 pgs.
"U.S. Appl. No. 15/200,450, Non Final Office Action dated Mar. 26, 2018", 26 pgs.
"U.S. Appl. No. 15/200,450, Response Filed Jul. 27, 2018 to Non Final Office Action dated Mar. 26, 2018", 14 pgs.
"U.S. Appl. No. 15/200,450, Final Office Action dated Oct. 18, 2018", 25 pgs.
"International Application Serial No. PCT US2017 037854, International Preliminary Report on Patentability dated Jan. 10, 2019", 9 pgs.
"U.S. Appl. No. 15/200,450, Response filed Mar. 18, 2019 to Final Office Action dated Oct. 18, 2018", 9 pgs.
"U.S. Appl. No. 15/200,450, Notice of Allowance dated Apr. 19, 2019", 19 pgs.
"U.S. Appl. No. 15/200,450, Amendment Under 37 C.F.R. 1.312 filed Jul. 18, 2019", 7 pgs.
"U.S. Appl. No. 15/200,450, PTO Response to Rule 312 Communication dated Sep. 12, 2019", 2 pgs.

\* cited by examiner

EFFICIENT PROVISIONING OF DEVICES

PRIORITY

This application is a continuation of U.S. patent application Ser. No. 15/200,450, filed Jul. 1, 2016, which is incorporated herein by reference in its entirety.

TECHNICAL FIELD

Embodiments pertain to efficient provisioning of devices. Some embodiments relate to efficient provisioning of network credentials to Internet of Things (IoT) devices.

BACKGROUND

The IoT is a network of physical devices or "things" embedded with electronics, software, and sensors which enables these objects to collect and exchange data between themselves and between other computing devices. Example "things" include connected home appliances, sensors in automobiles, biochips, and the like. These devices communicate with other devices, servers, and computers across one or more networks and may even form and participate in mesh networks.

Standards groups have begun the process of formulating standards that specify procedures for device discovery, communications between devices, service discovery, security, and other procedures used in forming and maintaining IoT networks. Example groups include the Open Interconnect Consortium (OIC), Internet Protocol for Smart Objects (IPSO) Alliance, and the Industrial Internet Consortium.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
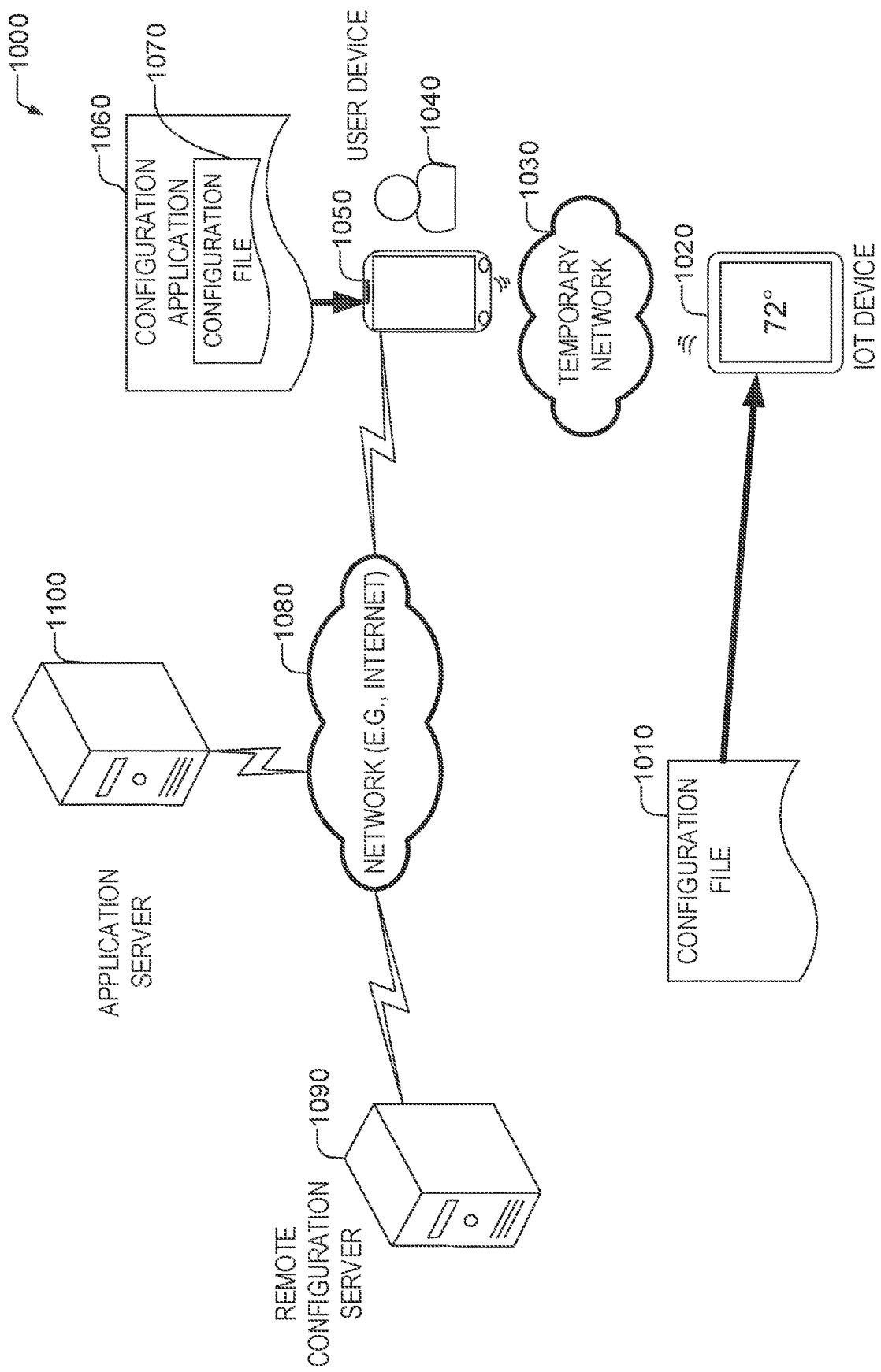
FIG. 1 shows a system of providing for enhanced device configuration according to some examples of the present disclosure.

An IoT device may be defined as a computing device with network connectivity and one or more network-accessible functions. These functions include reading sensor values, performing actions (such as actuation of a motor), providing status, and the like. Example IoT devices include connected thermostats, appliances, vehicles, and the like.

Many IoT devices also allow configuration remotely over a network. In order to connect to a network, the IoT device must be initially configured with network parameters of the end user's network. For example, the devices may need a Service Set Identifier (SSID), security information (e.g., security type such as Wi-Fi Protected Access 2 (WPA-2)), and password to connect to a Wireless Local Area Network (WLAN). Because the IoT device needs to at least be initially configured with these network parameters, many IoT devices include a user interface, such as a display and an input mechanism to enable such configuration. The additional hardware and software to implement a display and input mechanism increases the cost of these IoT devices. Furthermore, any configuration needs to be secured against unauthorized individuals. Some device manufacturers have responded with limited input capabilities and displays. For example, on-screen keyboards which require the user to hunt and click or press using a mouse or finger. These solutions are a hassle for users as they are slow and difficult to use.

Further, while so-called "headless" IoT devices that feature limited or no direct user input and output mechanisms (except a network connection) are desirable due to their low cost, these devices have a chicken and egg problem—without a user interface and with only a network configuration it is difficult to configure the device to operate on the network and thus be configured via the network. Current solutions to this problem focus on Near Field Communications (NFC) to configure the initial network parameters. This increases the cost of the device as often the IoT device needs two transmitters—a Wireless Local Area Network (WLAN) transmitter for regular operation and a NFC transmitter for initial configuration.

Disclosed in some examples are methods, systems, and machine readable mediums that provide for the configuration and provisioning of computing devices. In particular, computing devices with limited user interfaces, such as some IoT devices that may not have a display or local input device or than a network connection (e.g., headless IoT devices). The functionality of the IoT devices is thus improved as it allows for more efficient, more secure, and faster configuration without requiring the added expense of a dedicated display or other user interface.

The devices may be loaded at the factory with a configuration file that specifies a temporary network configuration. For example, details of a temporary Wireless Local Area Network (WLAN). This temporary network configuration (e.g., SSID and/or password) may be common to all devices produced at the factory, or may be customized for each particular device (e.g., based upon a Medium Access Control address of the device or a model number and/or serial #of the device). The temporary network configuration in some examples, may then be provided to a user of the device. The user then creates a temporary network with the given configuration. Once the temporary network is created and operational, the IoT device may be configured (for example, with a more permanent network configuration), and in some examples, the IoT device may authenticate the temporary network using a remote configuration service to ensure adequate security. In some examples, in order to ensure that the IoT device is to be allowed access to a more permanent network of the user, one or both of the user device and the remote configuration service may also authenticate the IoT device.

As noted, the temporary network configuration may be provided to a user of the IoT device. This may be done in a variety of ways. For example, the temporary network configuration may be provided in printed instruction materials provided with the device, printed on the box, or the like. The temporary network configuration may be printed in the form of text, bar code, QR code, or the like. In other examples, a user may access a website of a remote configuration server that may provide the temporary network configuration. In yet other examples, an application downloadable to a device of the end-user may provide similar functionality to the website by providing the temporary network configuration (either by contacting the remote configuration server, be pre-programmed with the temporary network configuration, be pre-programmed with a method to derive the temporary network configuration, or utilize a camera or other input device of the computing device to receive the temporary network configuration from printed materials).

If attackers are aware of the temporary network configuration ahead of time, it may be possible to setup a false network and hijack the device. To provide for extra security, in some examples, the temporary network configuration may depend on the model, serial number, MAC address, or other specifics of the device that is being configured. Users may input product information (e.g., model, serial number, and the like) into the website or application (in some examples, over a secure connection). The website or application may then derive the temporary network configuration from this product information. For example, a SSID may include a product name or identifier and a password may include the serial number of the device. Thus, one example temporary network configuration may include SSID: IoTdevicename Password: 12345678901234XYZ where the IoTdevicename is the name of the IoT device, 12345678901234 is the serial number and XYZ is any other series of characters or numbers.

In some examples, the product information may not be directly used in the temporary network configuration, but instead, may lead to the temporary network configuration. For example, the manufacturer may store a table indexed by the product information and leading to a unique identifier (e.g., a randomly determined number). The unique identifier may then be utilized in the temporary network configuration (e.g., as part of the SSID or the password). In still other examples, one or more of the unique identifier or the product information may be input into a formula whereby one or more of the parameters in the temporary network configuration may be calculated. For example, the serial number may be entered into a predetermined hash function which may then be used as one of the parameters for the temporary network configuration. As noted above, the IoT device comes with the temporary network configuration pre-installed. Thus, each IoT device may have a different temporary network configuration. Unless an attacker knows both the serial number or other product identifier and the formula for calculating the temporary parameters, it would be difficult for an attacker to create a temporary network that the IoT device connects to.

To create the temporary network, a user may configure their network such that the temporary network configuration grants the IoT device appropriate access. In other examples, the downloadable application may automatically create or configure a network according to the given temporary network configuration. For example, a smartphone may have a cellular data connection to a Wide Area Network (WAN) such as the Internet and have a WLAN transmitter to create a hotspot for other devices. The configuration application may create a WLAN hotspot according to the temporary network configuration automatically and link the cellular data connection to the created WLAN such that WLAN clients can access the smartphone's cellular connection to communicate over the WAN, thus providing the IoT device with a connection to the remote configuration server.

Additionally as noted, once the temporary network is created and the IoT device is able to connect to it, the device may verify the temporary network is created and maintained by an authorized user. For example, the IoT device may send a unique network identification information such as a Medium Access Control (MAC) address of the device providing the temporary network configured according to the given network configuration. These communications may be encrypted (e.g., through a Secured Socket Layer). The network identification information may be verified (having been previously provided by the user of the IoT device) and the verification may be confirmed to the IoT device. Once the verification is confirmed, the device may allow for continued configuration.

The device may then be configured. For example, the device may provide an on-board web-server that the user of the IoT device may connect with (over the temporary network). Various settings webpages may be provided to allow the user to set configuration parameters, including a standard network connection that the device is to use. Once a standard network connection is created, the device may attach to the standard network for more configuration or for normal operations. In other examples, the downloadable application may provide the user interfaces and may communicate with the IoT device (e.g., through an Application Programming Interface) to communicate the user's desired preferences. In still other examples, a user of the IoT device may connect to the configuration server and may specify their desired configuration parameters to the configuration server, which may then configure the IoT device. In some examples, the configuration parameters may be specified before or after the temporary network has been created, such as when the user is attempting to obtain the temporary network configuration. In these examples, once the IoT device connects to the configuration server through the temporary network, the configuration server may send the configuration file to the IoT device. The IoT device may then apply the configuration parameters in the configuration file.

In some examples, as part of the configuration, the device may engage in a "take ownership" procedure in which it gives configuration ownership to a particular device or person. One example take ownership procedure is the "resurrecting duckling model" which gives ownership to the first application that attempts to configure it, accepting any configuration its "mother" offered it. In other examples, there may be one or more ownership credentials such that an application seeking ownership must present the appropriate ownership credential. The ownership credential may be provided by the remote configuration server.

Also, in some examples, a user of the IoT device may wish to authenticate the device itself. In some examples, the user may know the device has a certain model number from a specific manufacturer. The manufacturer may place a credential in the device that states the model number and manufacturer. In one example, the device may contain a private key that it can use to sign a message. Then the user can verify the message using the credential. In one example, this private key may be for an anonymized digital signature method, such as Enhanced Privacy Identification (EPID), so that the device does not reveal any unique identification in the process of proving the model number and manufacturer of the device.

Turning now to FIG. 1 a system 1000 of providing for enhanced device configuration is shown according to some examples of the present disclosure. Configuration file 1010, comprising one or more configuration parameters, such as a temporary network configuration, may be loaded onto one or more IoT devices 1020. The configuration file 1010 may be loaded onto the IoT device 1020 prior to the user 1040 obtaining the IoT device 1020, for example, during manufacturing, distribution, or sales. IoT device 1020 may be any configurable device with network connectivity. In some examples, IoT devices 1020 may not have a network-independent way of being configured (e.g., they may not have a built in user interface and may not be connectable to user interface devices such as input and output devices—i.e., headless).

The configuration file 1010 may be the same configuration file loaded onto all the devices, or may be customized for each device. In some examples, the configuration file 1010 may include a temporary network configuration. The temporary network configuration may include information and credentials needed to access a temporary network. For example, a SSID, a security setting (e.g., a type of security), and a password. In some examples, the temporary network configuration is an open WLAN network, but in other examples it is a secure network with predetermined security credentials (e.g., password). In yet other examples, the temporary network may be any wired or wireless network including a Bluetooth piconet or scatternet, a Near Field Communication (NFC) network, a wired Local Area Network, Wide Area Network, or the like. In some examples, the temporary network configuration may include configurations for multiple networks, or multiple different types of networks.

Temporary network 1030 may be setup by a user 1040. Temporary network 1030 may be provided by user device 1050 according to the temporary network configuration provided to the user, or some other device (e.g., a WLAN router). For example, as already noted, the user device 1050 may employ a configuration application 1060 which may be preloaded with or may download a configuration file 1070 (e.g., from the remote configuration server 1090), or may derive the temporary network configuration. Configuration file 1070 may be the same as configuration file 1010 or may be different, however, each configuration file may include the temporary network configuration to create and connect to temporary network 1030.

Temporary network 1030 may provide connectivity to network 1080 to one or more devices such as IoT device 1020. IoT device 1020 and user device 1050 (through configuration application 1060, or through a general purpose application such as a browser) may communicate with remote configuration server 1090. User Device 1050 may authenticate the IoT device 1020 before proceeding further. After the optional authentication, user device 1050 may provide the IoT device 1020 with a network configuration and credentials for accessing the network 1080. In another embodiment, after the optional authentication, the user device 1050 may serve as a relay to allow the IoT device to connect to a remote configuration server 1090. The user device 1050 may allow this connection, while denying access to other sites on the network to the IoT device 1020.

The remote configuration server 1090 may authenticate the IoT device 1020 before proceeding further. Remote configuration server 1090 may perform one or more of: provide the configuration file 1070 to configuration application 1060, provide one or more user interfaces (e.g., a web site) to provide the temporary network configuration information to the user 1040 of user device 1050, authenticate the temporary network 1030 with the IoT device 1020, authenticate the IoT device, authenticate the user device, configure the IoT device 1020 and the like. For example, the user 1040 may download the configuration application 1060 from an application server 1100 (which in some examples may be the same as remote configuration server 1090). The configuration application 1060 may contain a configuration file 1070, download (e.g., from the remote configuration server 1090) a configuration file 1070, or derive a temporary network configuration (e.g., through logic contained in the configuration application 1060 and in some examples inputs from the user specifying product information of the IoT device 1020). Configuration file 1070 may include the temporary network configuration, or may include logic to calculate the temporary network configuration. In some examples, the configuration application may prompt the user and receive input to determine one or more properties of the device such as IoT device 1020. These properties may be utilized to derive one or more parameters of the temporary network configuration.

In other examples, the user 1040 may utilize a general purpose application on user device 1050 to access one or more interfaces of the remote configuration server 1090. For example, remote configuration server 1090 may provide one or more user interface descriptors (e.g., HyperText Markup Language (HTML), JavaScript, Content Style Sheets, eXtensible Markup Language, and other documents) to user device 1050 which, when rendered by a general purpose application (e.g., a browser) may provide one or more user interfaces (e.g., webpages or web applications). Users 1040 may download the configuration file 1070. In some examples, the user interfaces provided by the remote configuration server 1090 may elicit input by the user of one or more properties of the device (e.g., IoT device 1020). These properties may be utilized by the remote configuration server 1090, or by the user interface descriptors sent by remote configuration server 1090 to derive the temporary network configuration.

In some examples, upon power up, the IoT device 1020 may search for, and attempt to connect to the temporary network 1030. IoT device 1020 may periodically retry if a connection cannot be made. The retries may continue indefinitely or until a threshold number of tries is made and then the IoT device 1020 may give up.

Once connected to the temporary network 1030, the IoT device 1020 may collect information about the provider of the temporary network 1030 (e.g., in FIG. 1, the user device 1050), for example, the MAC address of the device. The IoT device 1020 may then establish a secure connection through temporary network 1030, user device 1050, and network 1080 to the remote configuration server 1090. Once a secure connection is established, the IoT device 1020 may validate that the temporary network 1030 is created by a user registered with the remote configuration server 1090 to configure the IoT device 1020. For example, when contacting the remote configuration server 1090 or when utilizing the configuration application 1060, the user may register themselves as owner of the IoT device 1020. In doing so, the user device 1050, may (over a secure connection) provide information about temporary network 1030. If the remote configuration server 1090 matches the information about temporary network 1030 provided by the IoT device 1020 (obtained from the temporary network 1030) with the information about the temporary network 1030 supplied by the user device 1050 (during registration), the temporary network 1030 may be authenticated and the remote configuration server 1090 may send a confirmation to the IoT device 1020. In some examples, if the temporary network 1030 is authenticated, the IoT device 1020 may then authenticate with the remote configuration service and/or the user device and may accept configuration through the temporary network 1030, otherwise, if the temporary network is not authenticated, the IoT device 1020 may not accept a configuration through the temporary network 1030.

In other examples, upon registering as the owner of the IoT device 1020, the user device 1050 may be provided one key of a cryptographic key pair and a number seed. The number seed may seed a number generator function in the configuration application 1060. The number generator function may produce a new number every predetermined period of time. This number is recreated at the remote configuration server 1090 using the same function and the same number seed. The number may be encrypted by the user device 1050 using the key provided to the configuration application 1060 and sent over the temporary network (e.g., in a beacon frame). Once the predetermined period of time elapses, a new number is generated, encrypted, and replaces the old number sent over the temporary network. Once the IoT device connects to the temporary network and establishes a secure connection with the remote configuration server 1090, the IoT device 1020 then reads the encrypted number from the temporary network and reports it to the remote configuration server 1090. The remote configuration server then decrypts the encrypted number with the other key of the cryptographic key pair (which is not shared with the configuration application 1060 or the user device 1050) and compares it against the number calculated by the remote configuration server using the function and seed value. If the numbers match, the temporary network is authenticated. If the numbers do not match, the temporary network is not authenticated. In some examples, the temporary network is not authenticated as even if the temporary network is setup by an attacker, as communications between the IoT device 1020 and the remote configuration server 1090 may be encrypted, the attacker may not gain access to the IoT device 1020. Indeed, by supplying the credential of the IoT device 1020 (e.g., supplied with the device—say the packaging) to the remote configuration server 1090, only the legitimate owner may have access to the device.

Once the IoT device 1020 is connected to the temporary network 1030 and in some examples, once the IoT device and/or the temporary network 1030 are authenticated, the IoT device 1020 may be configured. As noted previously, configuration may be done by the remote configuration server (based upon a user entering the desired settings at a user interface of the remote configuration server or through the configuration application), through the configuration application (e.g., the configuration application communicates using one or more APIs with the IoT device 1020 over the temporary network 1030), or through a general purpose application (e.g., a browser) on the user device 1050 or another computing device (e.g., the IoT device 1020 is configured using an onboard webserver that serves configuration pages).

Figure 2:
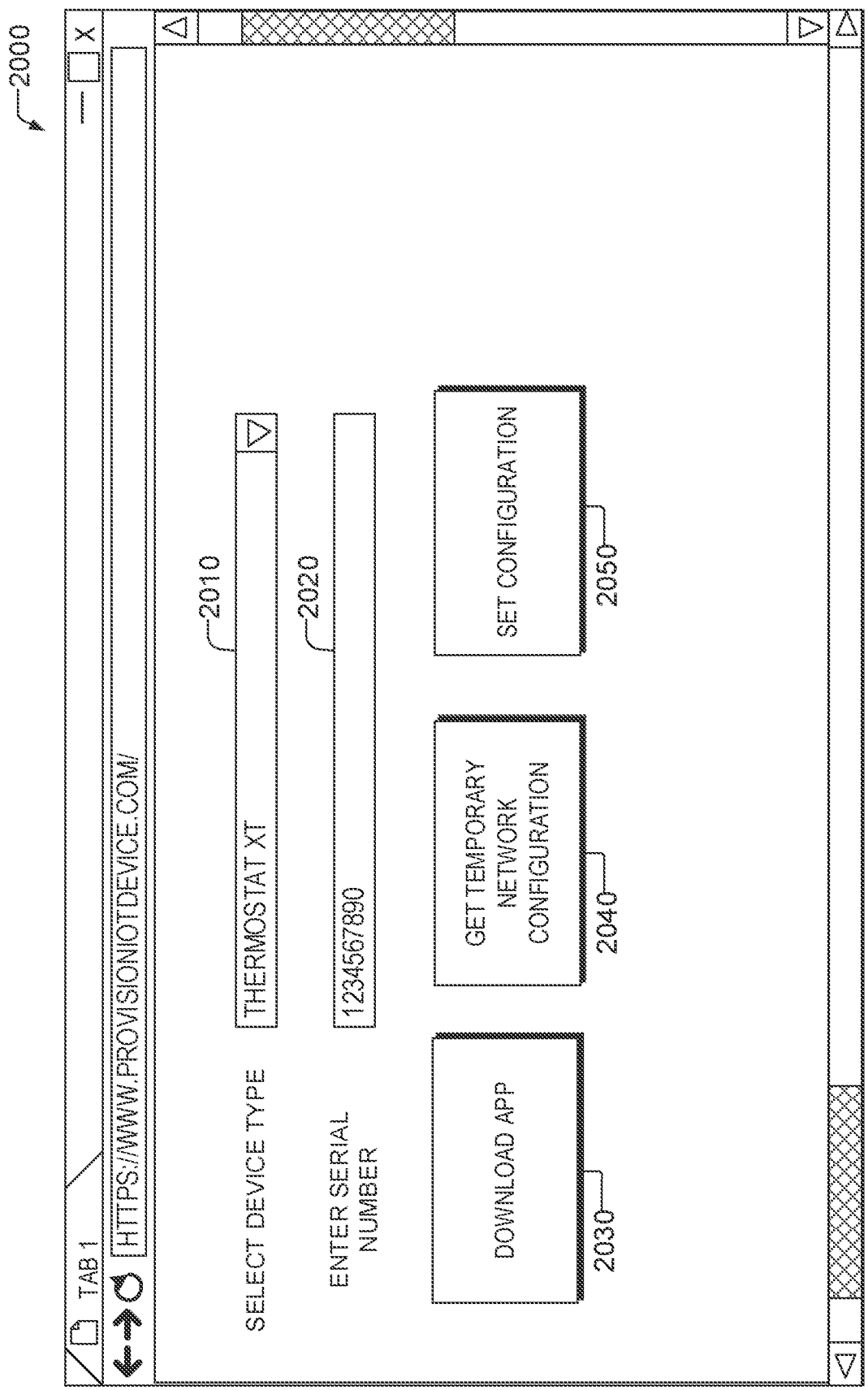
FIG. 2 shows a rendering of an example user interface provided by the user device based upon user interface descriptors provided by the remote configuration server according to some examples of the present disclosure.

Turning now to FIG. 2, a rendering 2000 of an example user interface provided by the user device (such as user device 1050) based upon user interface descriptors provided by the remote configuration server 1090 is shown according to some examples of the present disclosure. Rendering 2000 is rendered by a browser application (an example of a general purpose application) on the user device 1050. Input boxes 2010 and 2020 allow the user to enter information about the product (e.g., IoT device 1020)—namely the device type and the serial number. Button 2030 allows the user to optionally download a configuration application—in some examples, the product information determines a particular version of the configuration application specific to the product information entered. In other examples, the user may download the configuration application prior to entering the product information (the product information may be entered into user interface elements of the configuration application). Button 2040 allows the user to get the temporary network configuration information. Set configuration button 2050 may allow the user to enter configuration information to be loaded onto the IoT device once the device is connected to the temporary network and contacts the remote configuration server (e.g., remote configuration server 1090).

Figure 3:
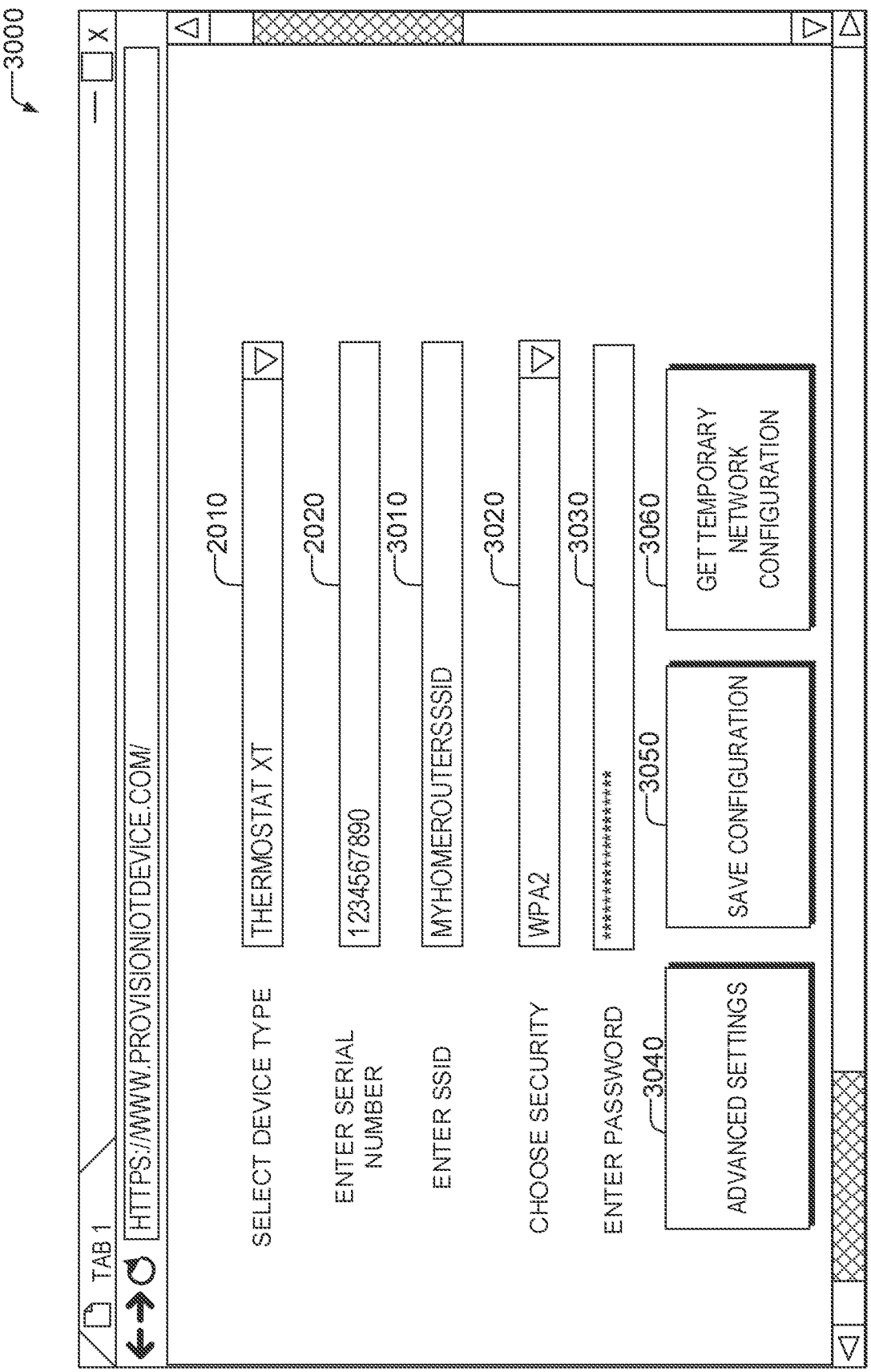
FIG. 3 shows a rendering of an example user interface provided by the user device based upon user interface descriptors provided by the remote configuration server according to some examples of the present disclosure.

Turning now to FIG. 3, a rendering 3000 of an example user interface provided by the user device (such as user device 1050) based upon user interface descriptors provided by the remote configuration server 1090 is shown according to some examples of the present disclosure. The rendering 3000 shows a rendering of one or more user interface descriptors resulting from, for example, activating button 2050 of FIG. 2. Product information input boxes 2010 and 2020 remain displayed. Network configuration input boxes, such as 3010-3020 allow for the user to specify the normal (non-temporary) network connection parameters, such as SSID, Security Type, and Password. In some examples, these may be stored in a datastore of the remote configuration server and loaded onto the IoT device once the IoT device connects to the remote configuration server through the temporary network.

Advanced settings button 3040 may lead to additional settings of the device. Save configuration button 3050 saves the configuration to the datastore of the remote configuration server for loading onto the IoT device. Get temporary network configuration button 3060 may display, download, or otherwise provide to the user the temporary network configuration. In some examples, once the non-temporary network configuration is loaded, the IoT device will transition from the temporary network to the non-temporary network to complete the configuration. The new configuration settings may be resettable by a reset button on the device such that mistakes in the input of the non-temporary network parameters may be rectified.

The renderings 2000 and 3000 are exemplary only and a person of ordinary skill in the art with the benefit of Applicants' disclosure will appreciate that other configurations, options, and input flows are contemplated.

Figure 4:
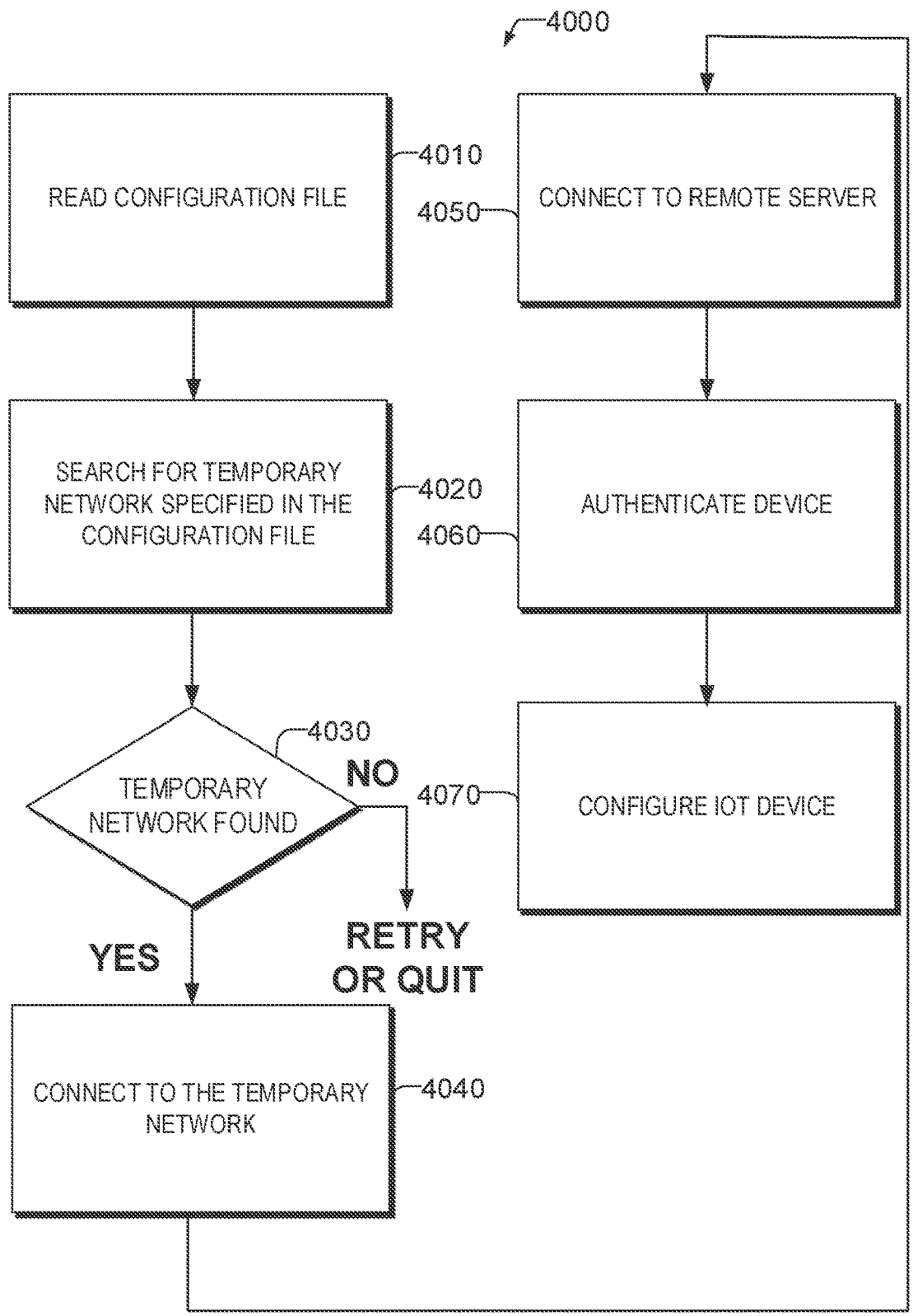
FIG. 4 shows a flowchart of a method of configuring an IoT device according to some examples of the present disclosure.

Turning now to FIG. 4, a flowchart of a method 4000 of configuring an IoT device is shown according to some examples of the present disclosure. At operation 4010 after being powered up for the first time, the IoT device reads the configuration file stored on the device. The configuration file has a temporary network configuration. At operation 4020 the device may search for the temporary network specified in the configuration file. As noted, the configuration file may specify one or more parameters used to connect to the temporary network, such as, the Service Set Identifier (SSID), the password, the security type, and the like. If the IoT device is able to find the temporary network at operation 4030, the IoT device may connect to the temporary network at operation 4040. If the IoT device is not able to connect to the temporary network, the device may retry (e.g., return to operation 4020) or quit (e.g., after a predetermined number of attempts).

At operation 4050, the IoT device may connect to the remote configuration server. The address of the remote configuration server may be provided in the configuration file or otherwise programmed into the device prior to powering on the device. The connection may be a secure connection, such as a Secure Socket Layer (SSL) connection.

At operation 4060, the remote configuration server may authenticate the IoT device to assure that it is a device that should be allowed on the permanent network. This authentication may ensure that the IoT device is tied to the user device, so that the remote configuration server receives assurance that the IoT device is a trusted one and that it is connected on a temporary network to a user device that is also trusted by the remote configuration server. This authentication may happen by having the remote configuration server send a Nonce for signing to the user device. The user device signs the Nonce and passes the signed Nonce to the IoT device. The IoT device may then establish an SSL session with the remote configuration server using an SSL certificate that was already in the IoT device. Then the IoT device may sign the Nonce using a key and certificate installed in the IoT device. The IoT device may then send this signature and the signature of the user device to the remote configuration server over the SSL link. The remote configuration could then verify the signatures, and if valid, provide the permanent network configuration over the SSL link. The user device would function as a relay for sending the SSL encrypted packets between the IoT device and the remote server. In one embodiment, the signature of the IoT device could be an anonymous signature, such as EPID, so that the remote server could verify the type of device, without receiving identity information about the IoT Device. At operation 4070 the IoT device is then configured with the desired configuration.

Figure 5:
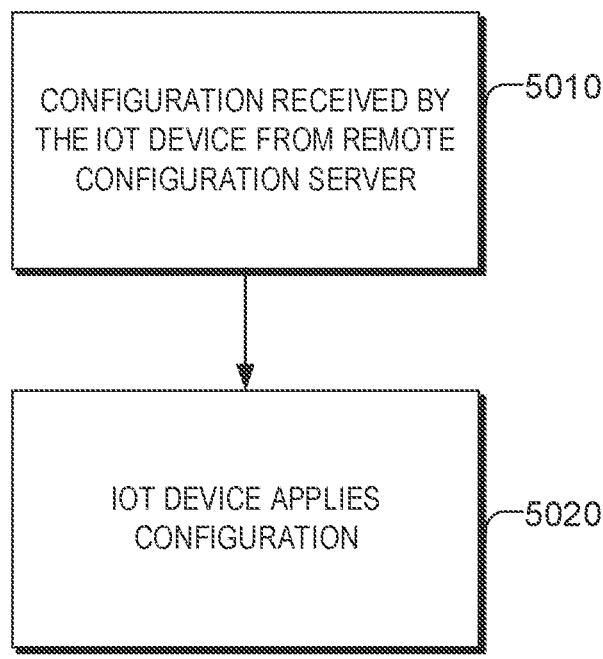
FIG. 5 shows a flowchart of a first example method of configuring the IoT device with the desired configuration according to some examples of the present disclosure.

Turning now to FIG. 5, a flowchart of a first example method of configuring the IoT device with the desired configuration is shown according to some examples of the present disclosure. At operation 5010 the IoT device receives a configuration from the remote configuration server. For example, the user of the IoT device may have previously specified a desired configuration at the remote configuration server. This desired configuration may then be sent to the IoT device upon establishing a connection between the IoT device and the remote configuration server. At operation 5020 the IoT device applies the configuration sent by the remote configuration server. For example, the IoT device may store or change one or more values in one or more configuration databases on the IoT device, store or modify one or more values in one or more storage devices on the IoT device, or the like.

Figure 6:
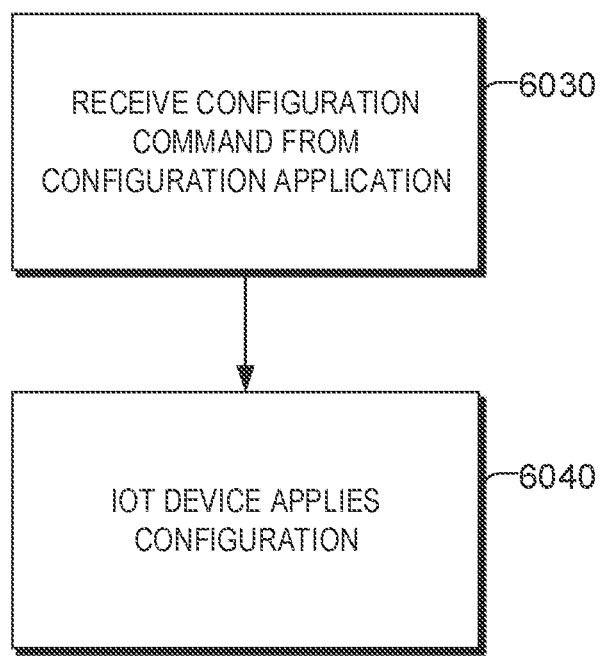
FIG. 6 shows a flowchart of a second example method of configuring the IoT device with the desired configuration according to some examples of the present disclosure.

Turning now to FIG. 6 a flowchart of a second example method of configuring the IoT device with the desired configuration is shown according to some examples of the present disclosure. At operation 6030 the IoT device may receive a configuration command from a configuration application. For example, a configuration application (e.g., 1060) on a user's device (e.g., user device 1050) may send one or more configuration commands over the temporary network (e.g., temporary network 1030) using one or more API commands. At operation 6040 the device may apply the configuration commands. For example, the IoT device may store or change one or more values in one or more configuration databases on the IoT device, store or modify one or more values in one or more storage devices on the IoT device, or the like. In some examples, the IoT device may verify that the device sending the configuration commands is authorized to send the commands (e.g., through use of an access credential).

Figure 7:
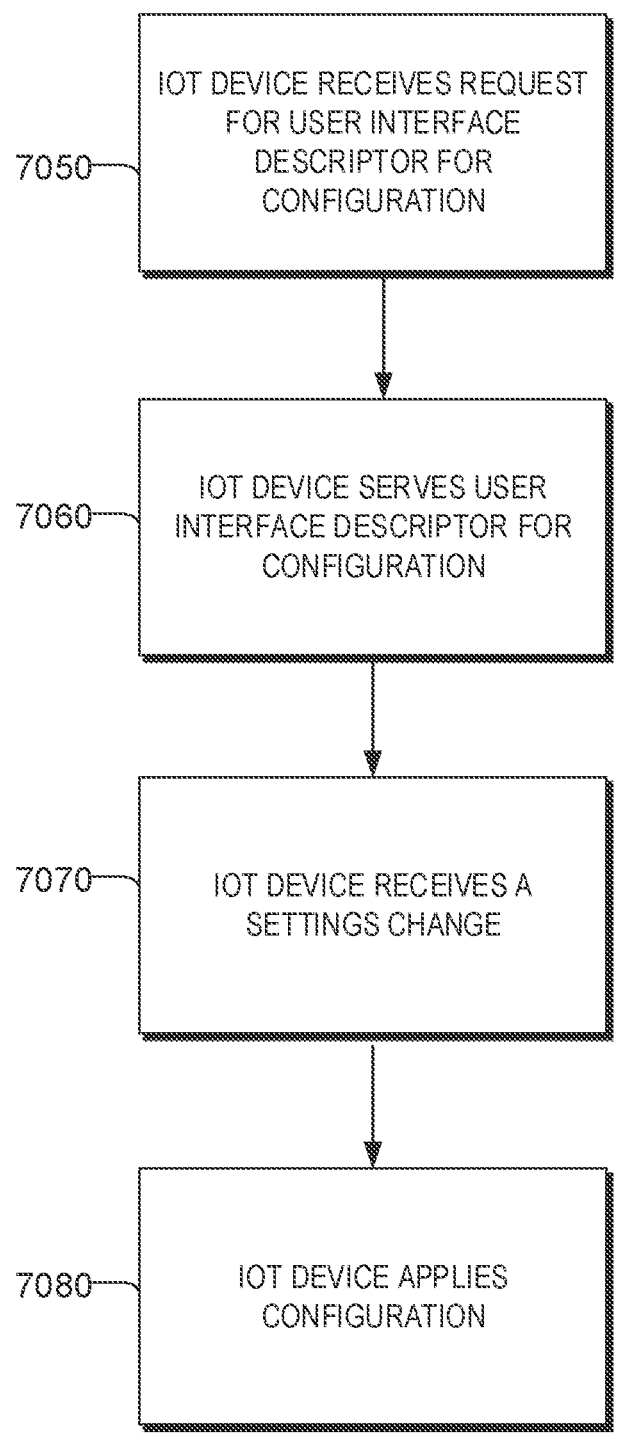
FIG. 7 shows a flowchart of a third example method of configuring the IoT device with the desired configuration according to some examples of the present disclosure.

Turning now to FIG. 7, a flowchart of a third example method of configuring the IoT device with the desired configuration is shown according to some examples of the present disclosure. In FIG. 7 the IoT device provides a web-based configuration U/I. For example, the IoT device provides a webserver that provides one or more user interface descriptors that, when rendered by a client device (e.g., a general purpose application on user device 1050) provide a graphical user interface in which a user may modify one or more configuration settings of the IoT device. At operation 7050 the IoT device receives a request from another device over the temporary network (or another network) for a user interface descriptor. At operation 7060 the IoT device serves the user interface descriptor to the requestor. At operation 7070, the IoT device receives a settings change command from the device as a result of the device's manipulation of one or more GUI elements (e.g., input boxes, buttons, and the like) of the user interface rendered according to the user interface descriptor. At operation 7080, the device applies the configuration change.

Figure 8:
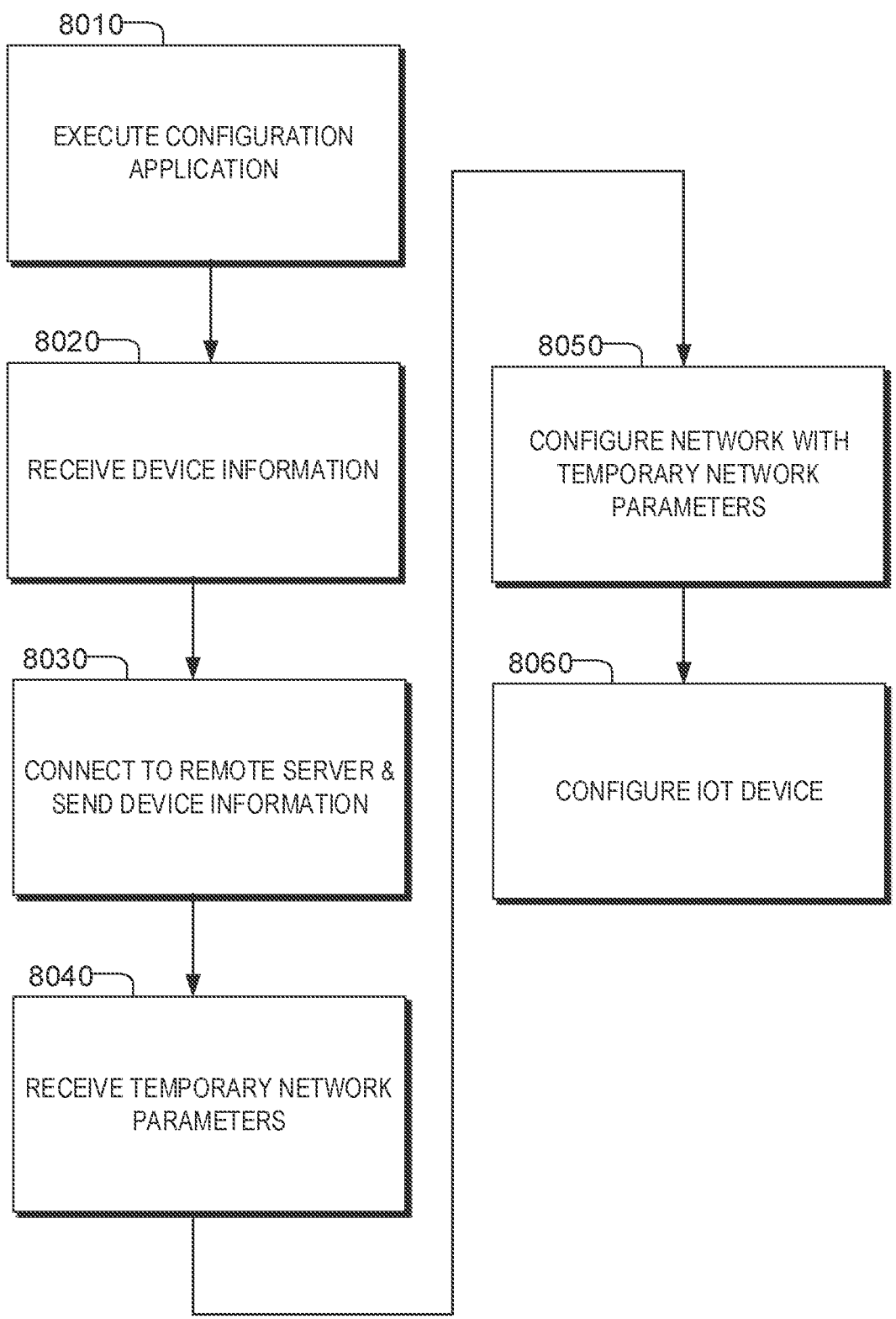
FIG. 8 shows a flowchart of a method of a device configuring an IoT device according to some examples of the present disclosure.

Turning now to FIG. 8, a flowchart of a method of a device (e.g., such as user device 1050) configuring an IoT device (such as IoT device 1020) is shown according to some examples of the present disclosure. At operation 8010 the device may execute a configuration application (e.g., configuration application 1060). The configuration application may provide one or more GUIs on the device to allow the user to enter various configuration and product information and to provide various information to the user. At operation 8020, the configuration application may receive, through the GUI, information about the device to be configured. Example information may include the model number, serial number, and the like. At operation 8030 the user device may connect to the remote configuration server and send the device information. In some examples, the user device may send a unique identifier of a too-be-created temporary network (e.g., a MAC address of a physical interface that will provide the network).

At operation 8040 the user device may receive the temporary network parameters from the remote server. In some examples, rather than contact the remote server as is shown in FIG. 6, the configuration application may have logic to derive the temporary network configuration.

At operation 8050 the temporary network is configured and provided to the IoT device according to the temporary network parameters. For example, the user device may create a Wi-Fi network automatically with the default SSID and password specified in the temporary network parameters. At operation 8060 the user device may configure the IoT device. For example, the user may access the web server (or other user interface descriptors) provided by the IoT device through one or more browsers (or other rendering agents) on the user device. In other examples, the configuration application may utilize an API to communicate with the IoT device across the temporary network to configure the IoT device. The configuration application may provide one or more GUIs to facilitate this configuration.

Figure 9:
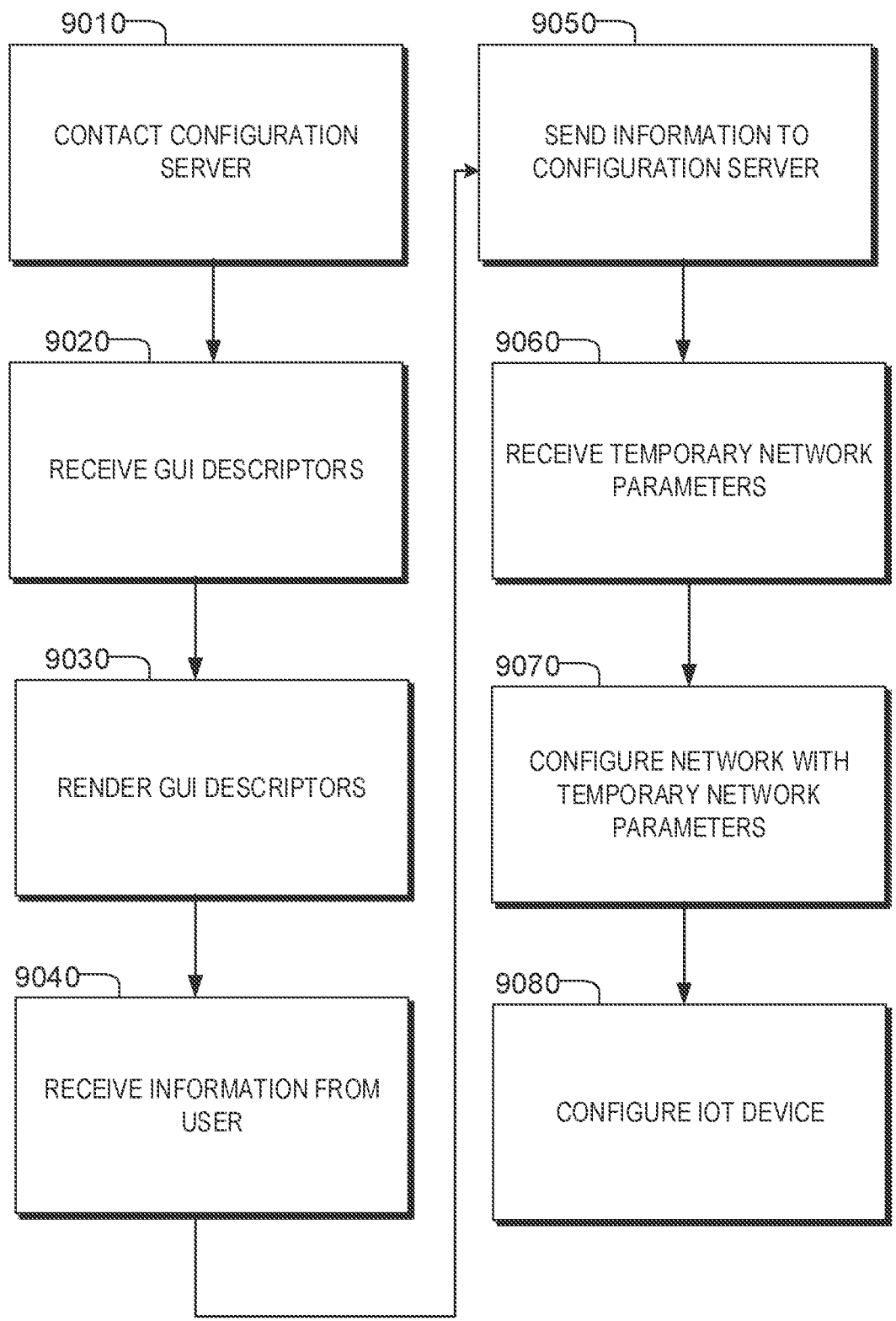
FIG. 9 shows a flowchart of a method of a device configuring an IoT device according to some examples of the present disclosure.

Turning now to FIG. 9, a flowchart of a method of a user device (e.g., such as user device 1050) configuring an IoT device (such as IoT device 1020) is shown according to some examples of the present disclosure. FIG. 9 utilizes a general purpose application running on the user device such as a browser. At operation 9010 the general purpose application contacts the configuration server to request one or more graphical user interface descriptors. At operation 9020 these GUI descriptors are received from the configuration server. For example, operations 9010 and 9020 may be conducted using one or more protocols such as Hyper Text Transfer Protocol (HTTP), File Transfer Protocol (FTP), or the like. At operation 9030 the general purpose application renders the GUI descriptors to create a GUI. The GUI may include one or more input boxes, information elements, and the like.

At operation 9040 the device receives one or more user selections made through the rendered GUI. These selections may include IoT device information (e.g., model number and serial number), configuration information, or both. At operation 9050 this information is sent to the configuration server (e.g., through HTTP or other messaging protocols). At operation 9060 the server may send, and the user device may receive the temporary network parameters. At operation 9070 the device creates the temporary network using the temporary network parameters. The GUI descriptors may interact with the general purpose application to create the temporary network, or the user may be prompted to do so manually. At operation 9080 the IoT device may be configured over the temporary network. In some examples, the user may access a web server (or other user interface descriptors) provided by the IoT device through the general purpose application (or other rendering agents) on the user device. In other examples, the user supplied the configuration at operations 9030 and 9040 to the remote server, and once the temporary network is setup, the configuration server may communicate this configuration to the IoT device. In other examples, the user may use the general purpose application to access additional GUI descriptors on the configuration server for configuring the IoT device (e.g., the configuration server accepts configuration settings and sends configuration commands to the IoT device).

Figure 10:
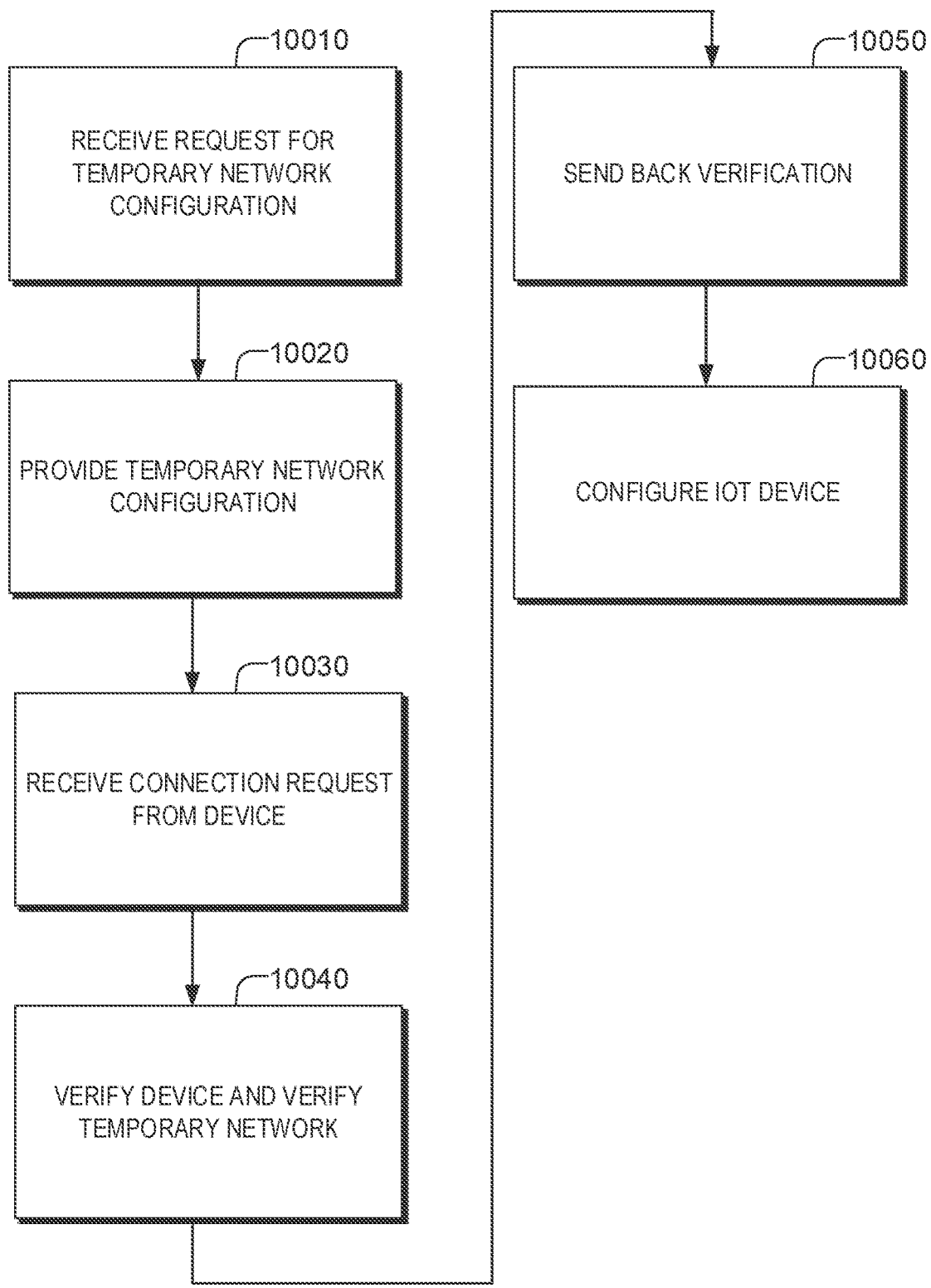
FIG. 10 shows a flowchart of a method of a remote configuration server according to some examples of the present disclosure.

Turning now to FIG. 10, a flowchart of a method of a remote configuration server is shown according to some examples of the present disclosure. At operation 10010 the remote configuration server receives a request for a temporary network configuration. This request may include device configuration settings. In some examples, the remote configuration server may provide one or more GUI descriptors which may facilitate a user device requesting the temporary network configuration. For example, the remote configuration server may include a web server functionality where users may access the functionality of the configuration server through one or more web pages (e.g., user interface descriptors). Users may input IoT device information, settings, and configurations into the web pages. This information is then sent to the remote configuration server. Alternatively, the users may download an application that provides a GUI natively on the user device that communicates this information to the remote configuration server.

At operation 10020, the remote configuration server may provide the temporary network configuration. The temporary network configuration for a particular device may be a default configuration used for all devices, or all devices of a particular type. In other examples, each IoT device produced may have a different temporary network configuration. In some examples, the temporary network configuration of each device is generated at manufacturing time and stored in the IoT device and also in a database accessible to the configuration server, indexed by one or more items of product information (e.g., a serial number). The configuration server may then access this database and pull the temporary network configuration corresponding to the particular IoT device by indexing the database using the received product information. In other examples, the temporary network configuration may be derivable from the product information such that a database is not necessary. One or both of the IoT device and the configuration server may contain the logic needed to derive the temporary network configuration.

At operation 10030 the configuration server may receive a connection request from the IoT device through the temporary network. This connection request may be to setup a secure connection. At operation 10040 the configuration server may verify the device and verify the temporary network as previously described. At operation 10050 the configuration server may send back a verification response. At operation 10060, in some examples, the configuration server may configure the device, either in response to configuration instructions entered by a user through a network based interface or as a result of previous instructions from the user.

Figure 11:
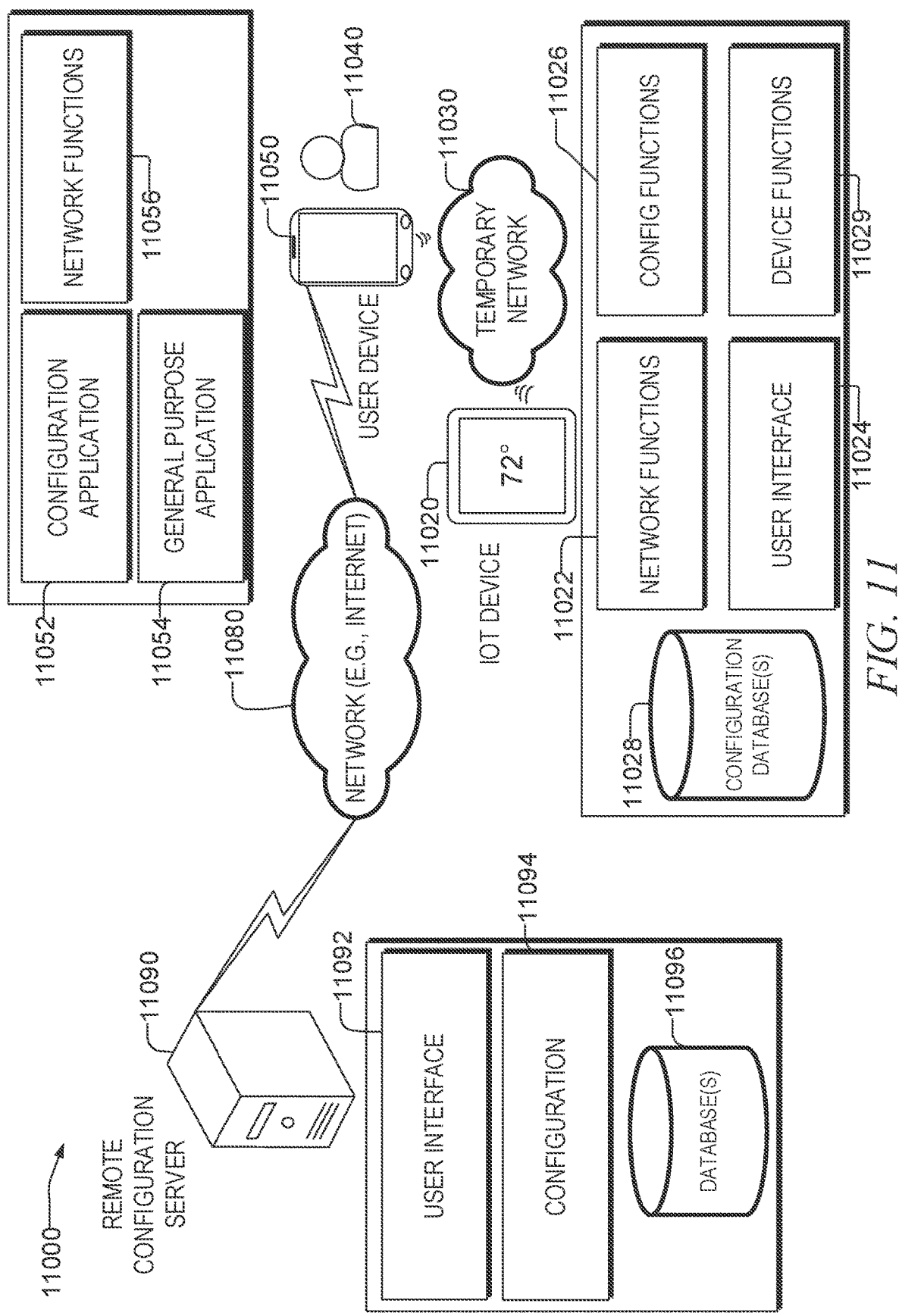
FIG. 11 shows a diagram of a system of providing for enhanced device configuration according to some examples of the present disclosure.

Turning now to FIG. 11 a system 11000 of providing for enhanced device configuration is shown according to some examples of the present disclosure. FIG. 11 is a more detailed version of FIG. 1 showing additional detail for the remote configuration server 11090, IoT device 11020, and user device 11050. Remote configuration server 11090 has a user interface module 11092 which provides one or more user interfaces (e.g., through one or more user interface descriptors) to one or more user devices 11050 for requesting a temporary network configuration and in some examples, for submitting information about the IoT device (e.g., IoT device 11020), and for configuring IoT device 11020. Remote configuration server 11090 also includes a configuration module 11094, which cooperates with the user interface module 11092 to provide one or more user interfaces for configuring one or more IoT devices. In some examples, the configuration user interface may be different depending on the type of device being configured. Remote configuration server 11090 also features a database 11096 which stores temporary network configurations and in some examples, configurations created by the user devices that will be downloaded to one or more IoT devices once those IoT devices connect to the remote configuration server 11090.

Network 11080 may be any network that allows the user device (e.g., user device 11050) and IoT device (e.g., IoT device 11020) to communicate with the remote configuration server 11090. Network 11080 in some examples is a portion of the Internet, a Wide Area Network (WAN), a Local Area Network (LAN), a cellular network, or the like.

User device 11050 may be any computing device, such as a smartphone, cellular phone, laptop, desktop, server, tablet, wearable and the like. In some examples, user device 11050 may download from a remote server (in some examples, the remote configuration server 11090, in other examples an application server 1100 such as the GOOGLE PLAY® store, or the APPSTORE® from APPLE®). Configuration application 11052 may obtain the temporary network configuration through communicating with the remote configuration server 11090, or by deriving the temporary network configuration from logic present in the configuration application. Configuration application 11052 may also enable a user to configure the IoT device (such as IoT device 11020). Configuration application 11052 may configure the IoT device by either communicating with the remote configuration server 11090 (which may then communicate the configuration to the IoT device 11020) or by directly communicating with the IoT device 11020 through one or more APIs.

User device 11050 may also have a general purpose application 11054 in some examples. Example general purpose applications include an Internet Browser, such as GOOGLE CHROME®, INTERNET EXPLORER®, MICROSOFT EDGE®, APPLE SAFARI®, or the like. General purpose application 11054 may request and receive from the remote configuration server 11090 one or more user interface descriptors (e.g., web pages). These user interface descriptors may be rendered by the general purpose application 11054 to produce one or more Graphical User Interfaces (GUI) which may allow the user device 11050 to obtain the temporary network configuration and in some examples, to configure the IoT device 11020.

Network functions 11056 may communicate over network 11080 to one or more other devices, such as the remote configuration server 11090. Network functions 11056 may include one or more network protocols, such as Transmission Control Protocol (TCP), Internet Protocol (IP), User Datagram Protocol (UDP), Ethernet, Cellular protocols (e.g., L1, L2, and other protocols), and the like. Network functions 11056 may also provide the ability to create a network, such as a temporary network 11030. Network functions 11056 may provide devices connected to the temporary network 11030 with access to the network 11080 by forwarding packets sent on the temporary network and that are addressed to devices on the Internet (or other network) across network 11080, and forwarding packets received from network 11080 and addressed to devices connected to the temporary network across temporary network 11030. In some examples, the temporary network 11030 may be a WLAN hotspot.

IoT device 11020 may be any device with network capability. While the IoT device 11020 is described with reference to the Internet of Things, it will be appreciated that the configuration methods and systems described herein will be applicable to any networked computing device. IoT device 11020 may include network functions 11022 for communicating across temporary network 11030 and network 11080. Network functions 11022 may include one or more network protocols, such as Transmission Control Protocol (TCP), Internet Protocol (IP), User Datagram Protocol (UDP), Ethernet, Cellular protocols (e.g., L1, L2, and other protocols), and the like. Network functions 11022 may attempt to connect to the temporary network 11030 specified by the temporary network configuration stored in a configuration database 11028.

IoT device 11020 may have a user interface module 11024 (e.g., a webserver and associated webpages) which may serve one or more user interface descriptors (web pages) to allow a user to configure the device over the temporary network. IoT device 11020 may also have a configuration functions module 11026 which may work with the user interface module 11024 to allow the user to configure the IoT device 11020. Configuration functions module 11026 may also communicate with other devices through an API to allow configuration through the API. Configuration functions module 11026 may communicate with the remote configuration server 11090 once the network functions module 11022 connects to the temporary network 11030 to verify the temporary network. Configuration functions module 11026 stores configuration changes in the configuration database 11028 and applies new configurations. Device functions module 11029 may implement the functions of the IoT device 11020, such as monitoring sensors, operating servos, computing things, and the like.

Figure 12:
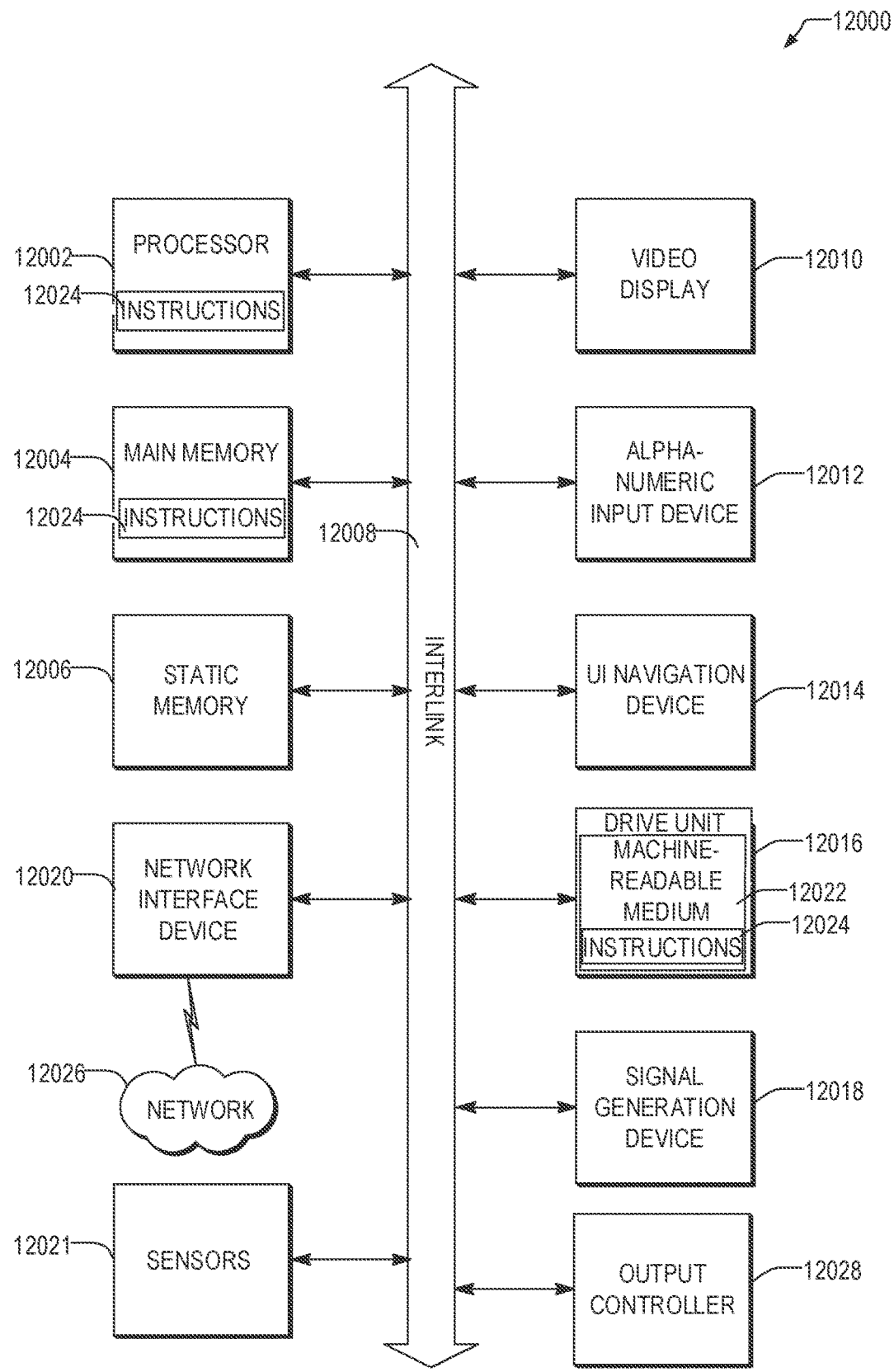
FIG. 12 is a block diagram illustrating an example of a machine upon which one or more embodiments may be implemented.

FIG. 12 illustrates a block diagram of an example machine 12000 upon which any one or more of the techniques (e.g., methodologies) discussed herein may perform. In alternative embodiments, the machine 12000 may operate as a standalone device or may be connected (e.g., networked) to other machines. In a networked deployment, the machine 12000 may operate in the capacity of a server machine, a client machine, or both in server-client network environments. In an example, the machine 12000 may act as a peer machine in peer-to-peer (P2P) (or other distributed) network environment. The machine 12000 may be a personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 12000 may include a hardware processor 12002 (e.g., a central processing unit (CPU), a graphics processing unit (GPU), a hardware processor core, or any combination thereof), a main memory 12004 and a static memory 12006, some or all of which may communicate with each other via an interlink (e.g., bus) 12008. The machine 12000 may further include a display unit 12010, an alphanumeric input device 12012 (e.g., a keyboard), and a user interface (UI) navigation device 12014 (e.g., a mouse). In an example, the display unit 12010, input device 12012 and UI navigation device 12014 may be a touch screen display. The machine 12000 may additionally include a storage device (e.g., drive unit) 12016, a signal generation device 12018 (e.g., a speaker), a network interface device 12020, and one or more sensors 12021, such as a global positioning system (GPS) sensor, compass, accelerometer, or other sensor. The machine 12000 may include an output controller 12028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 12016 may include a machine readable medium 12022 on which is stored one or more sets of data structures or instructions 12024 (e.g., software) embodying or utilized by any one or more of the techniques or functions described herein. The instructions 12024 may also reside, completely or at least partially, within the main memory 12004, within static memory 12006, or within the hardware processor 12002 during execution thereof by the machine 12000. In an example, one or any combination of the hardware processor 12002, the main memory 12004, the static memory 12006, or the storage device 12016 may constitute machine readable media.

While the machine readable medium 12022 is illustrated as a single medium, the term "machine readable medium" may include a single medium or multiple media (e.g., a centralized or distributed database, and/or associated caches and servers) configured to store the one or more instructions 12024.

The term "machine readable medium" may include any medium that is capable of storing, encoding, or carrying instructions for execution by the machine 12000 and that cause the machine 12000 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 12024 may further be transmitted or received over a communications network 12026 using a transmission medium via the network interface device 12020. The Machine 12000 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 12020 may include one or more physical jacks (e.g., Ethernet, coaxial, or phone jacks) or one or more antennas to connect to the communications network 12026. In an example, the network interface device 12020 may include a plurality of antennas to wirelessly communicate using at least one of single-input multiple-output (SIMO), multiple-input multiple-output (MIMO), or multiple-input single-output (MISO) techniques. In some examples, the network interface device 12020 may wirelessly communicate using Multiple User MIMO techniques.

Other Notes and Examples

Example 1 is an Internet of Things (IoT) device, the IoT device comprising: a network interface device; a processor; a memory, communicatively coupled to the processor and comprising instructions, the instructions, when performed by the processor, cause the processor to: read a temporary network configuration from a memory of the first device, the temporary network configuration stored in the memory of the first device prior to delivery of the first device to a customer; search for a temporary network created by a second device and corresponding to the temporary network configuration using the network interface device; responsive to finding the temporary network, connect to the temporary network using the network interface device; authenticate with a remote configuration server; responsive to authenticating with the remote configuration server, receive a configuration from the remote configuration server; and apply the configuration.

In Example 2, the subject matter of Example 1 optionally includes wherein the operations of connecting through the temporary network to a remote configuration server comprises operations to securely connect through the temporary network to the remote configuration server.

In Example 3, the subject matter of Example 2 optionally includes wherein the temporary network is a Wireless Local Area Network (WLAN).

In Example 4, the subject matter of any one or more of Examples 1-3 optionally include wherein the temporary network is a BLUETOOTH piconet.

In Example 5, the subject matter of any one or more of Examples 1-4 optionally include wherein the temporary network configuration comprises a Service Set Identifier (SSID).

In Example 6, the subject matter of Example 5 optionally includes wherein the SSID is derived based upon information about the first device.

In Example 7, the subject matter of any one or more of Examples 1-6 optionally include wherein the received configuration includes a network configuration, and wherein the operations comprises operations to leave the temporary network and connect to a network described by the network configuration.

Example 8 is a method, performed by a first device for configuring itself, the method comprising: using one or more computer processors of the first device to perform operations comprising: reading a temporary network configuration from a memory of the first device, the temporary network configuration stored in the memory of the first device prior to delivery of the first device to a customer; searching for a temporary network created by a second device and corresponding to the temporary network configuration; responsive to finding the temporary network, connecting to the temporary network; authenticating with a remote configuration server; responsive to authenticating with the remote configuration server, receiving a configuration from the remote configuration server; and applying the configuration.

In Example 9, the subject matter of Example 8 optionally includes wherein connecting through the temporary network to a remote configuration server comprises securely connecting through the temporary network to the remote configuration server.

In Example 10, the subject matter of Example 9 optionally includes wherein the temporary network is a Wireless Local Area Network (WLAN).

In Example 11, the subject matter of any one or more of Examples 8-10 optionally include wherein the temporary network is a BLUETOOTH piconet.

In Example 12, the subject matter of any one or more of Examples 8-11 optionally include wherein the temporary network configuration comprises a Service Set Identifier (SSID).

In Example 13, the subject matter of Example 12 optionally includes wherein the SSID is derived based upon information about the first device.

In Example 14, the subject matter of any one or more of Examples 8-13 optionally include wherein the received configuration includes a network configuration, and wherein the method comprises leaving the temporary network and connecting to a network described by the network configuration.

Example 15 is at least one machine-readable medium, including instructions, that when performed by the machine, causes the machine to perform the operations of any one of Examples 8-14.

Example 16 is an IoT device, comprising means for performing any one of Examples 8-14.

Example 17 is at least one machine-readable medium, the machine readable medium comprising instructions, which when performed by the machine, causes the machine to perform the operations to: read a temporary network configuration from a memory of the first device, the temporary network configuration stored in the memory of the first device prior to delivery of the first device to a customer; search for a temporary network created by a second device and corresponding to the temporary network configuration; responsive to finding the temporary network, connect to the temporary network; authenticate with a remote configuration server; responsive to authenticating with the remote configuration server, receive a configuration from the remote configuration server; and apply the configuration.

In Example 18, the subject matter of Example 17 optionally includes wherein the operations to connect through the temporary network to a remote configuration server comprise operations to securely connect through the temporary network to the remote configuration server.

In Example 19, the subject matter of Example 18 optionally includes wherein the temporary network is a Wireless Local Area Network (WLAN).

In Example 20, the subject matter of any one or more of Examples 17-19 optionally include wherein the temporary network is a BLUETOOTH piconet.

In Example 21, the subject matter of any one or more of Examples 17-20 optionally include wherein the temporary network configuration comprises a Service Set Identifier (SSID).

In Example 22, the subject matter of Example 21 optionally includes wherein the SSID is derived based upon information about the first device.

In Example 23, the subject matter of any one or more of Examples 17-22 optionally include wherein the received configuration includes a network configuration, and wherein the operations comprise operations to leave the temporary network and connect to a network described by the network configuration.

Example 24 is an IoT device comprising: means for reading a temporary network configuration from a memory of the first device, the temporary network configuration stored in the memory of the first device prior to delivery of the first device to a customer; means for searching for a temporary network created by a second device and corresponding to the temporary network configuration; means for connecting to the temporary network responsive to finding the temporary network; means for authenticating with a remote configuration server; means for receiving a configuration from the remote configuration server responsive to authenticating with the remote configuration server; and means for applying the configuration.

In Example 25, the subject matter of Example 24 optionally includes wherein means for connecting through the temporary network to a remote configuration server comprises means for securely connecting through the temporary network to the remote configuration server.

In Example 26, the subject matter of Example 25 optionally includes wherein the temporary network is a Wireless Local Area Network (WLAN).

In Example 27, the subject matter of any one or more of Examples 24-26 optionally include wherein the temporary network is a BLUETOOTH piconet.

In Example 28, the subject matter of any one or more of Examples 24-27 optionally include wherein the temporary network configuration comprises a Service Set Identifier (SSID).

In Example 29, the subject matter of Example 28 optionally includes wherein the SSID is derived based upon information about the first device.

In Example 30, the subject matter of any one or more of Examples 24-29 optionally include wherein the received configuration includes a network configuration, and wherein the IoT comprises means for leaving the temporary network and connecting to a network described by the network configuration.

Example 31 is a computing device for configuring a second computing device, the computing device comprising:

a network interface; a processor; a memory communicatively coupled to the processor, the memory including instructions, that when performed by the processor, cause the processor to perform operations to: receive device information for the second computing device; connect to a remote configuration server across a first network using the network interface and send the device information to the remote configuration server; receive temporary network parameters from the remote configuration server; create a temporary network according to the temporary network parameters using the network interface; allow the computing device to connect to the temporary network; forwarding data packets from the second computing device across the first network and data packets to the computing device received on the first network across the temporary network to the second computing device using the network interface; and causing a configuration of the second computing device through the temporary network.

In Example 32, the subject matter of Example 31 optionally includes wherein the device information is one of: a serial number, a model number, or a Medium Access Control (MAC) address.

In Example 33, the subject matter of any one or more of Examples 31-32 optionally include wherein the temporary network parameters includes a Service Set Identifier (SSID) and a password.

In Example 34, the subject matter of Example 33 optionally includes wherein creating the temporary network comprises creating a Wireless Local Area Network (WLAN) with an SSID and a password matching the received SSID and password.

In Example 35, the subject matter of any one or more of Examples 31-34 optionally include wherein creating the temporary network comprises creating a BLUETOOTH piconet.

In Example 36, the subject matter of any one or more of Examples 31-35 optionally include wherein the operations to cause the configuration of the computing device through the temporary network comprises operations to: receive a configuration setting from a user; and communicate the configuration setting to the computing device according to an Application Programming Interface (API) through the temporary network.

In Example 37, the subject matter of any one or more of Examples 31-36 optionally include wherein the operations to cause the configuration of the computing device through the temporary network comprises operations to: receive a configuration setting from a user; and communicate the configuration setting to the remote configuration server.

Example 38 is a method for configuring an IoT device, the method comprising: using one or more processors: receiving device information for a computing device; connecting to a remote configuration server across a first network and sending the device information to the remote configuration server; receiving temporary network parameters from the remote configuration server; creating a temporary network according to the temporary network parameters; allowing the computing device to connect to the temporary network; forwarding data packets from the computing device across the first network and data packets to the computing device received on the first network across the temporary network to the computing device; and causing a configuration of the computing device through the temporary network.

In Example 39, the subject matter of Example 38 optionally includes wherein the device information is one of: a serial number, a model number, or a Medium Access Control (MAC) address.

In Example 40, the subject matter of any one or more of Examples 38-39 optionally include wherein the temporary network parameters includes a Service Set Identifier (SSID) and a password.

In Example 41, the subject matter of Example 40 optionally includes wherein creating the temporary network comprises creating a Wireless Local Area Network (WLAN) with an SSID and a password matching the received SSID and password.

In Example 42, the subject matter of any one or more of Examples 38-41 optionally include wherein creating the temporary network comprises creating a BLUETOOTH piconet.

In Example 43, the subject matter of any one or more of Examples 38-42 optionally include wherein causing the configuration of the computing device through the temporary network comprises: receiving a configuration setting from a user; and communicating the configuration setting to the computing device according to an Application Programming Interface (API) through the temporary network.

In Example 44, the subject matter of any one or more of Examples 38-43 optionally include wherein causing the configuration of the computing device through the temporary network comprises: receiving a configuration setting from a user; and communicating the configuration setting to the remote configuration server.

Example 45 is at least one machine-readable medium, the machine-readable medium comprising instructions, that when performed by the machine, causes the machine to perform any one of Examples 38-44.

Example 46 is a computing device for configuring an IoT device comprising means for performing the methods of Examples 38-44.

Example 47 is at least one machine-readable medium, the machine-readable medium comprising instructions, that when performed by the machine, causes the machine to perform operations to: receive device information for a second computing device; connect to a remote configuration server across a first network using the network interface and send the device information to the remote configuration server; receive temporary network parameters from the remote configuration server; create a temporary network according to the temporary network parameters using a network interface; allow the computing device to connect to the temporary network; forwarding data packets from the second computing device across the first network and data packets to the computing device received on the first network across the temporary network to the second computing device using the network interface; and causing a configuration of the second computing device through the temporary network.

In Example 48, the subject matter of Example 47 optionally includes wherein the device information is one of: a serial number, a model number, or a Medium Access Control (MAC) address.

In Example 49, the subject matter of any one or more of Examples 47-48 optionally include wherein the temporary network parameters includes a Service Set Identifier (SSID) and a password.

In Example 50, the subject matter of Example 49 optionally includes wherein creating the temporary network comprises creating a Wireless Local Area Network (WLAN) with an SSID and a password matching the received SSID and password.

In Example 51, the subject matter of any one or more of Examples 47-50 optionally include wherein creating the temporary network comprises creating a BLUETOOTH piconet.

In Example 52, the subject matter of any one or more of Examples 47-51 optionally include wherein the operations to cause the configuration of the computing device through the temporary network comprises operations to: receive a configuration setting from a user; and communicate the configuration setting to the computing device according to an Application Programming Interface (API) through the temporary network.

In Example 53, the subject matter of any one or more of Examples 47-52 optionally include wherein the operations to cause the configuration of the computing device through the temporary network comprises operations to: receive a configuration setting from a user; and communicate the configuration setting to the remote configuration server.

Example 54 is a computing device for configuring a second computing device comprising: means for receiving device information for the second computing device; means for connecting to a remote configuration server across a first network and means for sending the device information to the remote configuration server; means for receiving temporary network parameters from the remote configuration server; means for creating a temporary network according to the temporary network parameters; means for allowing the second computing device to connect to the temporary network; means for forwarding data packets from the second computing device across the first network and data packets to the second computing device received on the first network across the temporary network to the computing device; and means for causing a configuration of the second computing device through the temporary network.

In Example 55, the subject matter of Example 54 optionally includes wherein the device information is one of: a serial number, a model number, or a Medium Access Control (MAC) address.

In Example 56, the subject matter of any one or more of Examples 54-55 optionally include wherein the temporary network parameters includes a Service Set Identifier (SSID) and a password.

In Example 57, the subject matter of Example 56 optionally includes wherein means for creating the temporary network comprises means for creating a Wireless Local Area Network (WLAN) with an SSID and a password matching the received SSID and password.

In Example 58, the subject matter of any one or more of Examples 54-57 optionally include wherein means for creating the temporary network comprises means for creating a BLUETOOTH piconet.

In Example 59, the subject matter of any one or more of Examples 54-58 optionally include wherein means for causing the configuration of the second computing device through the temporary network comprises: means for receiving a configuration setting from a user; and means for communicating the configuration setting to the second computing device according to an Application Programming Interface (API) through the temporary network.

In Example 60, the subject matter of any one or more of Examples 54-59 optionally include wherein means for causing the configuration of the second computing device through the temporary network comprises: means for receiving a configuration setting from a user; and means for communicating the configuration setting to the remote configuration server.

Example 61 is a computing device for configuring an Internet of Things (IoT) device, the computing device comprising: a processor; a memory, the memory comprising instructions, that when performed by the processor, cause the processor to perform operations to: receive, over a network, a request for a temporary network configuration for the IoT device from a user device, the request including information about the IoT device; receive desired configuration information for the IoT device from the user device; determine the temporary network configuration for the IoT device based upon the information about the IoT device; send the temporary network configuration for the IoT device to the user device; establish a communication session with the IoT device over the network and a temporary network configured according to the temporary network configuration; and configure the IoT device over the network and the temporary network using the desired configuration.

In Example 62, the subject matter of Example 61 optionally includes wherein the information about the device includes a model number and a serial number, and wherein the operations to determine the temporary network configuration for the IoT device based upon the information about the device comprises operations to derive Wireless Local Area Network (WLAN) Service Set Identifier (SSID) using the model number and derive a password using the serial number.

In Example 63, the subject matter of any one or more of Examples 61-62 optionally include wherein the desired configuration includes a second network configuration.

In Example 64, the subject matter of any one or more of Examples 61-63 optionally include wherein the temporary network configuration matches a temporary network configuration stored in the IoT device when the IoT device was manufactured.

In Example 65, the subject matter of any one or more of Examples 61-64 optionally include wherein the operations to establish the communication session with the IoT device over the network and the temporary network comprises operations to establish an encrypted session.

In Example 66, the subject matter of any one or more of Examples 61-65 optionally include wherein the operations comprise operations to provide one or more graphical user interface (GUI) descriptors which, when rendered, provide a GUI for requesting the temporary network configuration and submitting the desired configuration.

In Example 67, the subject matter of any one or more of Examples 61-66 optionally include wherein the operations comprise operations to provide one or more graphical user interface (GUI) descriptors which, when rendered, provide a GUI for requesting the temporary network configuration and submitting the desired configuration.

In Example 68, the subject matter of any one or more of Examples 61-67 optionally include wherein the operations comprise operations to configure the IoT device responsive to authenticating the IoT device.

Example 69 is a method performed by a configuration service, the method comprising: using one or more processors: receiving, over a network, a request for a temporary network configuration for an Internet of Things (IoT) device from a user device, the request including information about the IoT device; receiving desired configuration information for the IoT device from the user device; determining the temporary network configuration for the IoT device based upon the information about the IoT device; sending the temporary network configuration for the IoT device to the user device; establishing a communication session with the IoT device over the network and a temporary network configured according to the temporary network configuration; and configuring the IoT device over the network and the temporary network using the desired configuration.

In Example 70, the subject matter of Example 69 optionally includes wherein the information about the device includes a model number and a serial number, and wherein determining the temporary network configuration for the IoT device based upon the information about the device comprises deriving Wireless Local Area Network (WLAN) Service Set Identifier (SSID) using the model number and deriving a password using the serial number.

In Example 71, the subject matter of any one or more of Examples 69-70 optionally include wherein the desired configuration includes a second network configuration.

In Example 72, the subject matter of any one or more of Examples 69-71 optionally include wherein the temporary network configuration matches a temporary network configuration stored in the IoT device when the IoT device was manufactured.

In Example 73, the subject matter of any one or more of Examples 69-72 optionally include wherein establishing the communication session with the IoT device over the network and the temporary network comprises establishing an encrypted session.

In Example 74, the subject matter of any one or more of Examples 69-73 optionally include providing one or more graphical user interface (GUI) descriptors which, when rendered, provide a GUI for requesting the temporary network configuration and submitting the desired configuration.

In Example 75, the subject matter of any one or more of Examples 69-74 optionally include providing one or more graphical user interface (GUI) descriptors which, when rendered, provide a GUI for requesting the temporary network configuration and submitting the desired configuration.

In Example 76, the subject matter of any one or more of Examples 69-75 optionally include configuring the IoT device responsive to authenticating the IoT device.

Example 77 is at least one machine-readable medium comprising instructions, that when performed by the machine, cause the machine to perform the operations of any of Examples 69-76.

Example 78 is a computing device for configuring an IoT device comprising means to perform the operations of any of Examples 69-76.

Example 79 is at least one machine-readable medium comprising instructions, that when performed by a machine, cause the machine to perform operations to: receive, over a network, a request for a temporary network configuration for an Internet of Things (IoT) device from a user device, the request including information about the IoT device; receive desired configuration information for the IoT device from the user device; determine the temporary network configuration for the IoT device based upon the information about the IoT device; send the temporary network configuration for the IoT device to the user device; establish a communication session with the IoT device over the network and a temporary network configured according to the temporary network configuration; and configure the IoT device over the network and the temporary network using the desired configuration.

In Example 80, the subject matter of Example 79 optionally includes wherein the information about the device includes a model number and a serial number, and wherein the operations to determine the temporary network configuration for the IoT device based upon the information about the device comprises operations to derive Wireless Local Area Network (WLAN) Service Set Identifier (SSID) using the model number and derive a password using the serial number.

In Example 81, the subject matter of any one or more of Examples 79-80 optionally include wherein the desired configuration includes a second network configuration.

In Example 82, the subject matter of any one or more of Examples 79-81 optionally include wherein the temporary network configuration matches a temporary network configuration stored in the IoT device when the IoT device was manufactured.

In Example 83, the subject matter of any one or more of Examples 79-82 optionally include wherein the operations to establish the communication session with the IoT device over the network and the temporary network comprises operations to establish an encrypted session.

In Example 84, the subject matter of any one or more of Examples 79-83 optionally include wherein the operations comprise operations to provide one or more graphical user interface (GUI) descriptors which, when rendered, provide a GUI for requesting the temporary network configuration and submitting the desired configuration.

In Example 85, the subject matter of any one or more of Examples 79-84 optionally include wherein the operations comprise operations to provide one or more graphical user interface (GUI) descriptors which, when rendered, provide a GUI for requesting the temporary network configuration and submitting the desired configuration.

In Example 86, the subject matter of any one or more of Examples 79-85 optionally include wherein the operations comprise operations to configure the IoT device responsive to authenticating the IoT device.

Example 87 is a computing device for configuring an IoT device, the computing device comprising: means for receiving, over a network, a request for a temporary network configuration for an Internet of Things (IoT) device from a user device, the request including information about the IoT device; means for receiving desired configuration information for the IoT device from the user device; means for determining the temporary network configuration for the IoT device based upon the information about the IoT device; means for sending the temporary network configuration for the IoT device to the user device; means for establishing a communication session with the IoT device over the network and a temporary network configured according to the temporary network configuration; and means for configuring the IoT device over the network and the temporary network using the desired configuration.

In Example 88, the subject matter of Example 87 optionally includes wherein the information about the device includes a model number and a serial number, and wherein the means for determining the temporary network configuration for the IoT device based upon the information about the device comprises means for deriving Wireless Local Area Network (WLAN) Service Set Identifier (SSID) using the model number and deriving a password using the serial number.

In Example 89, the subject matter of any one or more of Examples 87-88 optionally include wherein the desired configuration includes a second network configuration.

In Example 90, the subject matter of any one or more of Examples 87-89 optionally include wherein the temporary network configuration matches a temporary network configuration stored in the IoT device when the IoT device was manufactured.

In Example 91, the subject matter of any one or more of Examples 87-90 optionally include wherein the means for establishing the communication session with the IoT device over the network and the temporary network comprises means for establishing an encrypted session.

In Example 92, the subject matter of any one or more of Examples 87-91 optionally include means for providing one or more graphical user interface (GUI) descriptors which, when rendered, provide a GUI for requesting the temporary network configuration and submitting the desired configuration.

In Example 93, the subject matter of any one or more of Examples 87-92 optionally include means for providing one or more graphical user interface (GUI) descriptors which, when rendered, provide a GUI for requesting the temporary network configuration and submitting the desired configuration.

In Example 94, the subject matter of any one or more of Examples 87-93 optionally include means for configuring the IoT device responsive to authenticating the IoT device.

What is claimed is:

1. A computing device, the computing device comprising:
   a network interface device;
   a processor;
   a memory, communicatively coupled to the processor and comprising instructions, the instructions, when performed by the processor, cause the processor to perform operations to:
   identify a temporary network configuration, the temporary network configuration including a network identifier and a password, the network identifier and password both comprise one or more of: a device name of the computing device, a serial number of the computing device, a network address of the computing device, or a model number of the computing device;
   search for a temporary network created by a second device and corresponding to the temporary network configuration using the network interface device;
   responsive to finding the temporary network, connect to the temporary network using the network interface device;
   authenticate a unique identifier of the second device with a remote configuration server over the temporary network;
   responsive to successfully authenticating with the remote configuration server, receive a configuration from the remote configuration server, the configuration including settings for connecting to a second network; and
   apply the configuration by leaving the temporary network and connecting to the second network provided by the second device, wherein the unique identifier of the second device is a Medium Access Control (MAC) address.

2. The computing device of claim 1, wherein the operations of connecting through the temporary network to a remote configuration server comprises operations to securely connect through the temporary network to the remote configuration server.

3. The computing device of claim 2, wherein the temporary network is a Wireless Local Area Network (WLAN).

4. The computing device of claim 3, wherein the network identifier is a Service Set Identifier (SSID).

5. The computing device of claim 1, wherein the operations to identify the temporary network configuration comprise retrieving a configuration file from non-volatile storage.

6. A method comprising:
   using one or more computer processors of a computing device:
   identifying a temporary network configuration, the temporary network configuration including a network identifier and a password, the network identifier and password both comprise one or more of: a device name of the computing device, a serial number of the computing device, a network address of the computing device, or a model number of the computing device;
   searching for a temporary network created by a second device and corresponding to the temporary network configuration using a network interface device;
   responsive to finding the temporary network, connecting to the temporary network using the network interface device;
   authenticating a unique identifier of the second device with a remote configuration server over the temporary network;
   responsive to successfully authenticating with the remote configuration server, receiving a configuration from the remote configuration server, the configuration including settings for connecting to a second network; and
   applying the configuration by leaving the temporary network and connecting to the second network provided by the second device, wherein the unique identifier of the second device is a Medium Access Control (MAC) address.

7. The method of claim 6, wherein connecting through the temporary network to a remote configuration server comprises securely connecting through the temporary network to the remote configuration server.

8. The method of claim 7, wherein the temporary network is a Wireless Local Area Network (WLAN).

9. The method of claim 8, wherein the network identifier is a Service Set Identifier (SSID).

10. The method of claim 6, wherein identifying the temporary network configuration comprise retrieving a configuration file from non-volatile storage.

11. The method of claim 6, wherein the temporary network is a BLUETOOTH piconet.

12. At least one non-transitory machine-readable medium, storing instructions, which when performed by a computing device, causes the computing device to perform operations comprising:
identifying a temporary network configuration, the temporary network configuration including a network identifier and a password, the network identifier and password both comprise one or more of: a device name of the computing device, a serial number of the computing device, a network address of the computing device, or a model number of the computing device;
   searching for a temporary network created by a second device and corresponding to the temporary network configuration using a network interface device;
   responsive to finding the temporary network, connecting to the temporary network using a network interface device;
   authenticating a unique identifier of the second device with a remote configuration server over the temporary network;
   responsive to successfully authenticating with the remote configuration server, receiving a configuration from the remote configuration server, the configuration including settings for connecting to a second network; and
   applying the configuration by leaving the temporary network and connecting to the second network provided by the second device, wherein the unique identifier of the second device is a Medium Access Control (MAC) address.

13. The at least one non-transitory machine-readable medium of claim 12, wherein the operations of connecting through the temporary network to a remote configuration server comprises operations to securely connect through the temporary network to the remote configuration server.

14. The at least one non-transitory machine-readable medium of claim 13, wherein the temporary network is a Wireless Local Area Network (WLAN).

15. The at least one non-transitory machine-readable medium of claim 14, wherein the network identifier is a Service Set Identifier (SSID).

16. The at least one non-transitory machine-readable medium of claim 12, wherein the operations to identify the temporary network configuration comprise retrieving a configuration file from non-volatile storage.

* * * * *